United States Patent

Seo et al.

[11] Patent Number: 6,157,759
[45] Date of Patent: Dec. 5, 2000

[54] OPTICAL FIBER PASSIVE ALIGNMENT APPARATUS AND METHOD THEREFOR

[75] Inventors: Phil-seung Seo, Jeonlabuk-do; Hyung-jae Lee, Kyungki-do; Tae-hyung Rhee, Kyungki-do; Hyoun-soo Kim, Kyungki-do; Sang-yun Yi, Kyungki-do, all of Rep. of Korea

[73] Assignee: Samsung Electronics Co., Ltd., Kyungki-Do, Rep. of Korea

[21] Appl. No.: 09/106,840

[22] Filed: Jun. 30, 1998

[30] Foreign Application Priority Data

Jul. 3, 1997 [KR] Rep. of Korea ................. 97-30824

[51] Int. Cl.$^7$ .................................................. G02B 6/30
[52] U.S. Cl. ........................................ 385/49; 385/14
[58] Field of Search ...................... 385/49, 14, 50, 385/51

[56] References Cited

U.S. PATENT DOCUMENTS

| | | | |
|---|---|---|---|
| 5,015,059 | 5/1991 | Booth et al. | 385/49 |
| 5,123,068 | 6/1992 | Hakoun et al. | 385/14 |
| 5,150,440 | 9/1992 | Booth | 385/49 |
| 5,175,781 | 12/1992 | Hockaday et al. | 385/49 |
| 5,231,683 | 7/1993 | Hockaday et al. | 385/49 |
| 5,343,544 | 8/1994 | Boyd et al. | 385/46 |
| 5,357,593 | 10/1994 | Bossler | 385/49 |
| 5,359,687 | 10/1994 | McFarland et al. | 385/49 |
| 5,463,708 | 10/1995 | Yui et al. | 385/49 |
| 5,481,632 | 1/1996 | Hirai et al. | 385/49 |
| 5,594,824 | 1/1997 | Kerndlmaier | 385/49 |
| 5,600,745 | 2/1997 | Wuu et al. | 385/49 |
| 5,854,868 | 12/1998 | Yoshimura et al. | 385/49 |

FOREIGN PATENT DOCUMENTS

| | | |
|---|---|---|
| 0324492 | 7/1989 | European Pat. Off. . |
| 0562699 | 9/1993 | European Pat. Off. . |
| 0 652 451 | 5/1995 | European Pat. Off. . |
| 0 682 276 | 11/1995 | European Pat. Off. . |
| 63-24204 | 2/1988 | Japan . |
| 0126608 | 5/1989 | Japan ........................ 385/49 |
| 405107425A | 4/1993 | Japan ........................ 385/49 |
| 405196835A | 8/1993 | Japan ........................ 385/49 |
| 405257032A | 10/1993 | Japan ........................ 385/49 |
| 6-51155 | 2/1994 | Japan . |
| 7-20358 | 1/1995 | Japan . |
| 2272306 | 5/1994 | United Kingdom . |
| WO 93/18422 | 9/1993 | WIPO . |
| WO 95/14947 | 6/1995 | WIPO . |

OTHER PUBLICATIONS

Grand et al., "New Method For Low Cost And Efficient Optical Connections Between SingleMode Fibres And Silica Guides", Elecrtronics Letters, vol. 27., No. 1, Jan. 1991. pp. 16–18.

Grand et al.; "New Method For . . . Silica Guides", Electronics Letters, 3rd Jan., 1991, vol. 27, No. 1, pp. 16–18.

*Primary Examiner*—Thong Nguyen
*Assistant Examiner*—John Juba, Jr.
*Attorney, Agent, or Firm*—Leydig, Voit & Mayer, Ltd.

[57] ABSTRACT

An optical fiber passive alignment apparatus for passively aligning an optical fiber with an input/output optical waveguide of an integrated optical device, and a method therefor. The optical fiber passive alignment apparatus includes: an optical waveguide formed on a planar substrate along the longitudinal direction of the planar substrate, having a core which is shorter than the planar substrate; an optical fiber mounting portion formed to a predetermined length on the planar substrate in the longitudinal direction of the planar substrate, such that the optical waveguide and the optical fiber contact each other, for receiving the optical fiber; and a cavity located between the optical fiber mounting portion and a core of the optical waveguide, filled with a material whose refractive index slightly increases on irradiation by UV rays such that the refractive index of the material is not substantially different from the refractive index of a core of the optical fiber. Therefore, forming the optical waveguide whose core flares gradually reduces dependency of coupling loss on horizontal displacement, and importance of precisely positioning the optical fiber is decreased.

2 Claims, 4 Drawing Sheets

OPTICAL FIBER PASSIVE ALIGNMENT APPARATUS AND METHOD THEREFOR

BACKGROUND OF THE INVENTION

1. Field of the Invention

The present invention relates to an apparatus for aligning an optical waveguide and an optical fiber, and a method therefor, and more particularly, to an optical fiber passive alignment apparatus for passively aligning an optical fiber to be coupled with an input/output optical waveguide of an integrated optical device in which optical waveguide devices having various functions are integrated in a substrate, and a method thereof.

2. Description of the Related Art

In general, an optical fiber can be attached to an optical waveguide device by the following two methods. First, after waveguiding incident light into an optical fiber or device, the position of the optical fiber is precisely adjusted, and the optical power at the output port of the optical waveguide or optical filter is measured, to fix the optical fiber and optical waveguide in the maximum optical power state. This is called an active alignment method. On the other hand, without directing the light, the optical fiber and the optical waveguide are automatically aligned to be coupled with each other according to the shape or structure of those coupling portions, in what is called a passive alignment method.

The active alignment method has been common as a method of coupling the optical waveguide and optical fiber. The active alignment method requires a light source and a photodetector in order to align the optical fiber and optical waveguide. Also, the optical fiber and the optical waveguide may be precisely aligned with submicron accuracy with respect to an alignment axis having six degrees of freedom. Thus, the alignment is difficult and requires much time.

FIGS. 1A and 1B are a three-dimensional view and a side view illustrating a conventional passive alignment method. According to this method, a waveguide layer 101 is formed in a portion onto which an optical fiber is to be mounted of a planar substrate 100 such that a core center of the waveguide and a core center of the optical fiber match, thereby forming an optical fiber mounting portion 103 having a V-groove. Then, a groove is formed perpendicular to the optical fiber mounting portion 103 having the V-groove, such that the optical fiber 110 can be closely pushed against the optical fiber mounting portion 103 while being parallel with the optical waveguide. The cross-section of the optical fiber 110 is precisely ground, and the optical fiber 110 is mounted onto the optical fiber mounting portion 103 having the V-groove and pushed closely against the cross-section of the optical waveguide. Then, the optical fiber 110 and the optical waveguide are adhered to each other.

However, in the passive alignment method, because the diameters of the cores of the optical fiber and optical waveguide have dimensions within several a very precise shape and structure of the coupling portion, accurate positioning of the optical fiber end, and accurate cross-section grinding of the optical fiber end are necessary in order to reduce coupling loss. Thus, alignment is time-consuming and expensive.

SUMMARY OF THE INVENTION

To solve these problems, it is an objective of the present invention to provide an optical fiber passive alignment apparatus for passively aligning an optical fiber with an input/output optical waveguide of an integrated optical device, and a method therefor.

According to an aspect of the above objective, there is provided an optical fiber passive alignment apparatus for passively aligning an optical fiber with an input/output optical waveguide of an integrated optical device, comprising: an optical waveguide formed on a planar substrate along the longitudinal direction of the planar substrate, having a core which is shorter than the planar substrate; an optical fiber mounting portion formed to a predetermined length on the planar substrate in the longitudinal direction of the planar substrate, such that the optical waveguide and the optical fiber contact each other, for receiving the optical fiber; and a cavity located between the optical fiber mounting portion and a core of the optical waveguide, filled with a material whose refractive index slightly increases on irradiation by UV rays such that the refractive index of the material is not substantially different from the refractive index of a core of the optical fiber.

Preferably, the cavity has a cross-section in the shape of a triangle, square, semicircle or polygon, and the cavity is formed by a method selected from the group consisting of silicon substrate etching, mechanical precision processing and precision molding.

According to another aspect of the objective, there is provided an optical fiber passive alignment method for passively aligning an optical fiber with an input/output optical waveguide of an integrated optical device, comprising the steps of: (a) forming an optical waveguide as a layer in a longitudinal direction of a planar substrate; (b) forming an optical fiber mounting portion on the planar substrate, onto which the optical fiber is to be mounted to couple the optical fiber and the optical waveguide; (c) forming a cavity of a predetermined size between the optical fiber mounting portion and the optical waveguide; (d) mounting the optical fiber onto the optical fiber mounting portion; (e) injecting a material whose refractive index increases by irradiation of UV rays, into the cavity; and (f) coupling the optical fiber and the optical waveguide by irradiating UV rays onto the material filling the cavity.

Preferably, in the step (b) of forming the optical fiber mounting portion, a portion of the optical waveguide layer formed on the planar substrate is partially removed to form the optical fiber mounting portion for coupling the optical fiber and the optical waveguide.

Also, there is provided an optical fiber passive alignment method for passively aligning an optical fiber with an input/output optical waveguide of an integrated optical device, comprising the steps of: (a) forming an optical waveguide in a longitudinal direction of a planar substrate; (b) forming an optical fiber mounting portion on the planar substrate, onto which the optical fiber is to be mounted to couple the optical fiber and the optical waveguide; (c) mounting the optical fiber in the optical fiber mounting portion near the optical waveguide, and fixing the optical fiber; (d) cutting the optical fiber mounted onto the optical fiber mounting portion near the optical waveguide and the optical waveguide, such that cross-sections of the optical fiber and optical waveguide are simultaneously ground, thereby forming a cavity of a predetermined size between the optical fiber mounting portion and the optical waveguide; (e) injecting a material whose refractive index increases by irradiation of UV rays, into the cavity; and (f) coupling the optical fiber and the optical waveguide by irradiating UV rays onto the material filling the groove.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 1A:
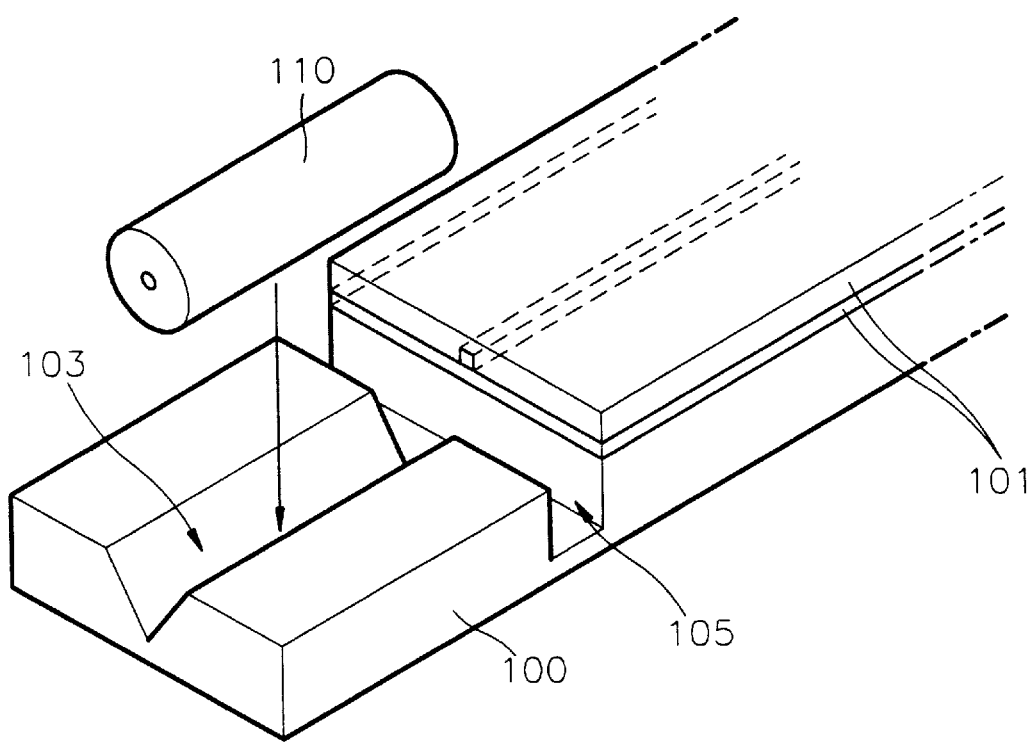
FIGS. 1A and 1B are a 3-dimensional view and a side view illustrating a conventional passive alignment method.
Figure 1B:
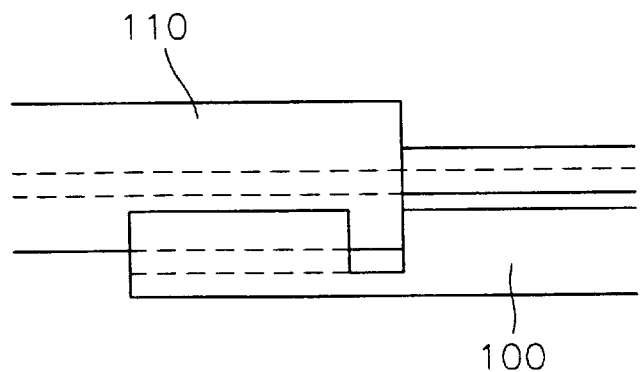
Figure 2A:
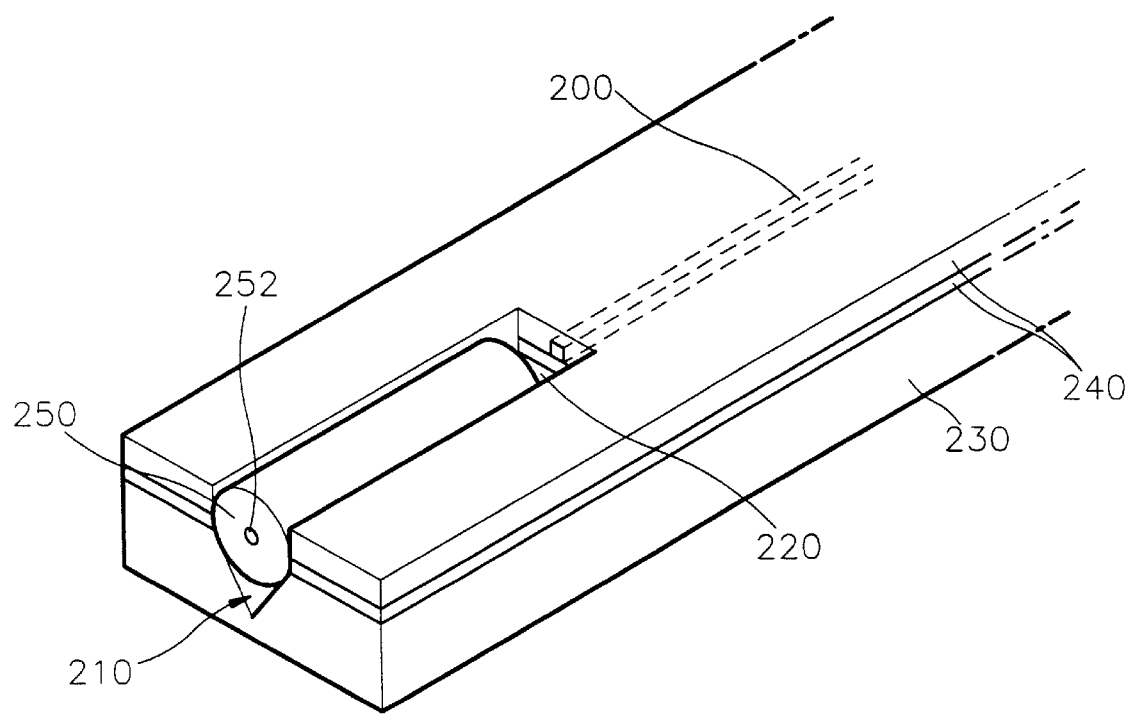
FIGS. 2A and 2B are a 3-dimensional view and a side view illustrating an optical fiber passive alignment apparatus onto which an optical fiber is mounted, and a method, according to an embodiment of the present invention.
Figure 2B:
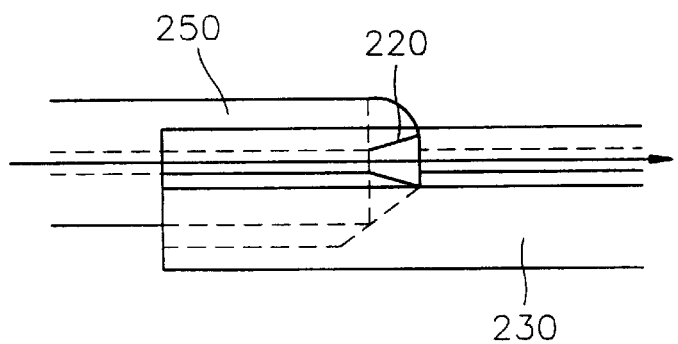

Referring to FIGS. 2A and 2B, an optical fiber passive alignment apparatus according to the present invention includes an optical waveguide 240, an optical fiber mounting portion 210 and a cavity 220.

The optical waveguide 240 provides a light directing path, and an optical waveguide core 200 is located on a planar substrate 230 in the longitudinal direction of the planar substrate 230, shorter than the planar substrate 230. The optical waveguide 240 is formed as an optical waveguide layer by depositing silica on the silicon planar substrate 230.

The optical fiber mounting portion 210 is a portion onto which an optical fiber 250 is mounted. The optical fiber mounting portion 210 has a predetermined length on the planar substrate 230 in the longitudinal direction of the planar substrate 230, such that the optical waveguide 220 and the optical fiber 250 contact. To form the optical fiber mounting portion 210, a portion onto which the optical fiber 250 is to be mounted is removed from the formed optical waveguide 240, and then the Si crystalline substrate 230 is anisotropically etched using a potassium hydroxide (KOH) solution, resulting in the optical fiber mounting portion 210 having a V-groove shape, such that the center of an optical fiber core 252 is aligned with the center of the optical waveguide core 200.

The cavity 220 is located between the optical fiber mounting portion 210 and the optical waveguide core 200, and is filled with a material, such as UV-curable resin, with a refractive index that slightly increases upon irradiation with UV rays such that the refractive index is not substantially different from the refractive index of the optical fiber core 252. Here, the cavity 220 may have any shape capable of receiving the optical fiber, e.g., triangular, square, or semicircular, and may be formed by silicon substrate etching, precision mechanical processing or precision molding.

Figure 3A:
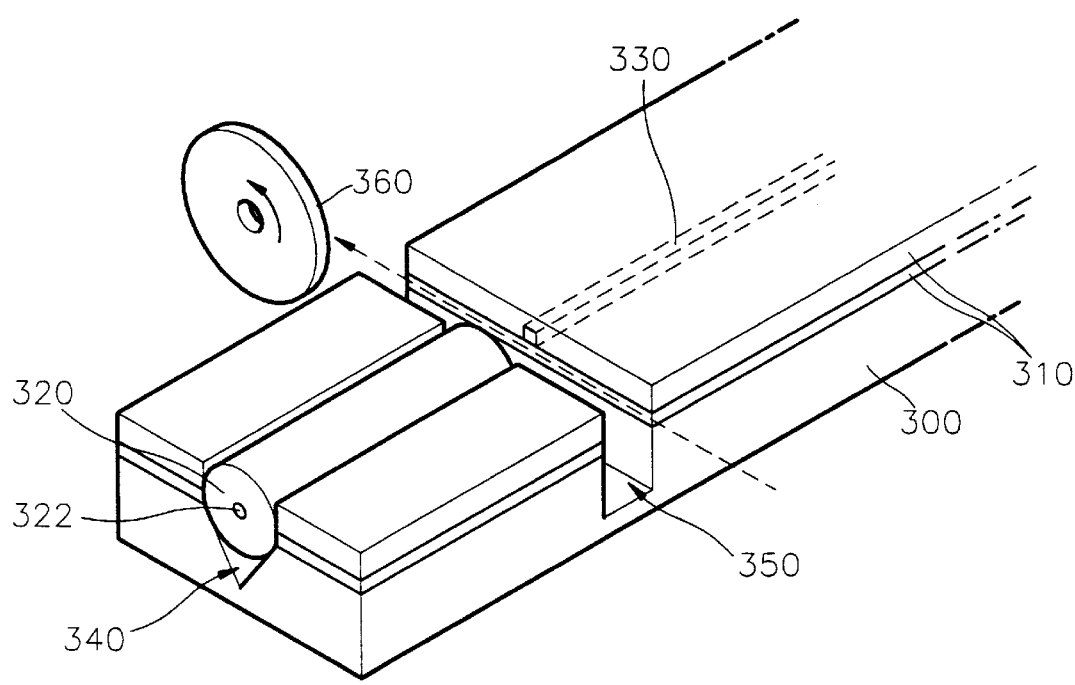
FIGS. 3A and 3B are a 3-dimensional view and a side view illustrating an optical fiber passive alignment apparatus and a method therefor according to another embodiment of the present invention.
Figure 3B:
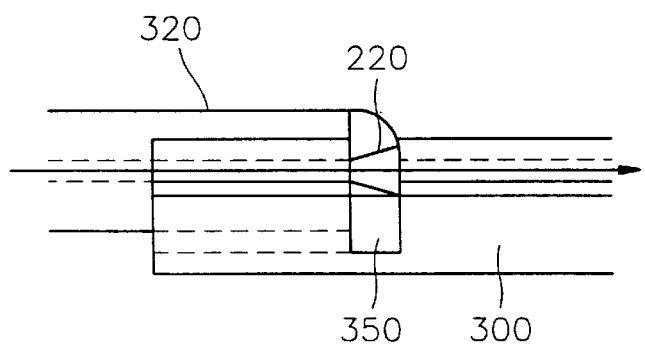

FIGS. 3A and 3B are a 3-dimensional view and a side view illustrating an optical fiber passive alignment apparatus for coupling an optical waveguide and an optical fiber, and a method, according to another embodiment of the present invention. That is, as shown in FIG. 3A, after forming the V-groove on the optical waveguide, the optical fiber is mounted in the V-groove, and the optical fiber and the optical waveguide are simultaneously vertically sliced.

As shown in FIG. 3A, after silica is deposited on a silicon substrate to form an optical waveguide 310 as a layer, a portion corresponding to the optical waveguide layer in which the optical fiber is mounted, is removed. Then, the Si crystalline substrate is anisotropically etched using a potassium hydroxide (KOH) solution, resulting in an optical fiber mounting portion 340 having a V-groove shape, such that the center of an optical fiber core 322 is aligned with the center of an optical waveguide core 330. Then, a cavity 350 into which a material having a refractive index that increases on irradiation with UV rays is to be injected, is made using a dicing blade 360 having a thickness equal to several microns. As a result, there is an effect in that the optical fiber and the optical waveguide are simultaneously ground.

By using the above optical fiber passive alignment apparatus, the optical fiber and the optical waveguide are aligned by the following method. A material whose refractive index increases by UV irradiation, e.g., UV-curable resin, is injected into the cavity of the optical fiber passive alignment apparatus, that is, between the mounted optical fiber and the optical waveguide. Then, UV rays supplied through the optical fiber. As a result, the portion struck by UV rays is cured, and the refractive index of the cured portion increases more than the non-cured portion, thereby resulting in an optical waveguide whose core flares out. The optimum optical waveguide can be obtained by controlling the intensity and irradiation time of the UV rays. Due to such optical waveguide whose core flares gradually, the coupling loss between the optical fiber and the optical waveguide is affected relatively less by horizontal displacement, which represents the degree of misalignment between the core axes of the optical fiber and optical waveguide.

Figure 4:
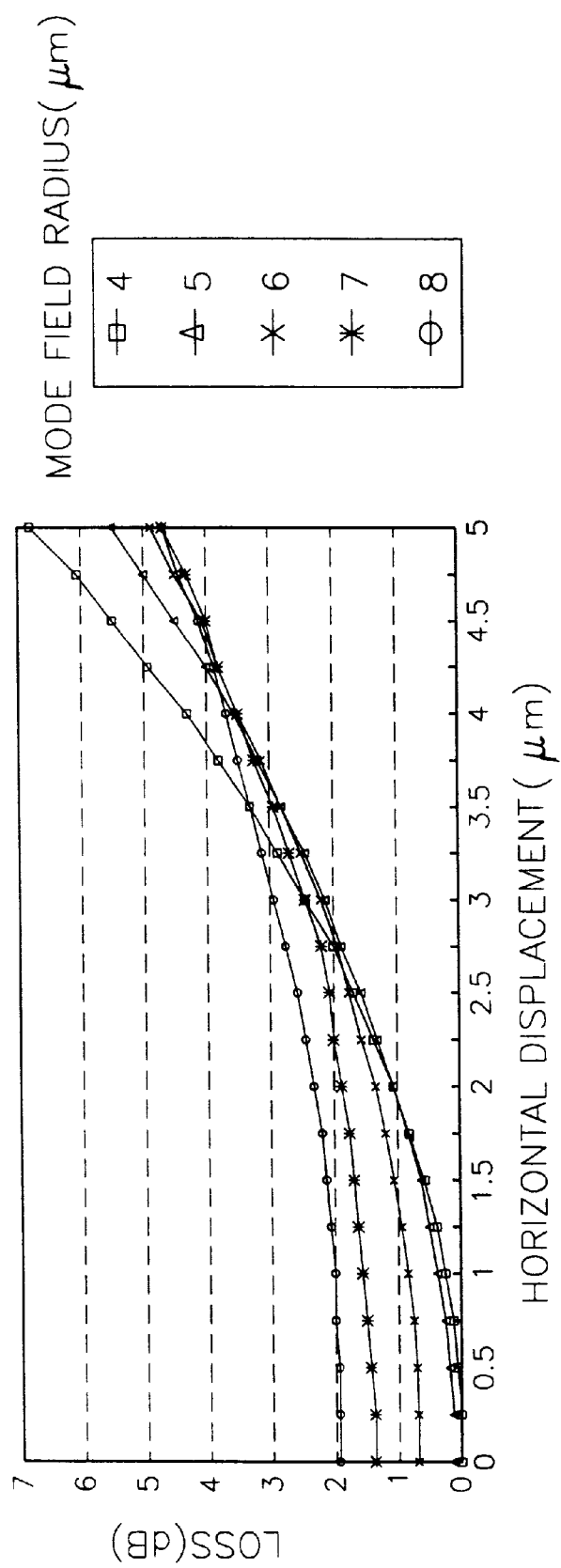
FIG. 4 is a graph showing the change of coupling loss according to mode field radius and horizontal displacement.

FIG. 4 is a graph showing the change in coupling loss according to mode field radius and horizontal displacement. As the mode field radius of the optical waveguide increases by irradiation with UV rays, the dependency of the coupling loss on the horizontal displacement gradually decreases. The effect of the optical waveguide having a gradually flared core can be verified as follows. Assuming that the mode field of the optical fiber and optical waveguide shows a Gaussian distribution, and the interval and slope between the optical fiber and optical waveguide are 0, the coupling loss between the optical fiber and optical waveguide is expressed by the following mathematical formula (1).

$$\text{coupling loss} = -10\text{Log}\left(\left(\frac{2w_1 w_2}{w_1^2 + w_2^2}\right)^2 \exp\left[\frac{-2d^2}{w_1^2 + w_2^2}\right]\right) \text{[dB]} \quad (1)$$

where $w_1$ and $w_2$ represent the field mode radii (1/e power radii) of the optical fiber and the optical waveguide, and d represents the horizontal displacement between the optical fiber and the optical waveguide.

Thus, as shown in FIG. 4, the rate of change of the coupling loss depending on the horizontal displacement decreases as the field mode radius increases. Here, it is assumed that the field mode radius of the optical waveguide is 4 µm.

In this embodiment, an optical fiber having a single core is used for convenience of explanation. However, the optical fiber may have multiple cores without restriction to the above.

In general, the field mode radius increases as the core diameter increases. Thus, in the present invention, forming an optical waveguide whose core gradually flares reduces the dependency of the coupling loss on the horizontal displacement. Thus, it is unnecessary to precisely control the shape or structure of the coupling portion.

In particular, in the above second embodiment of the present invention, the optical waveguide and the optical fiber having a single core or multiple cores are simultaneously cut perpendicular to the substrate. Also, at the same time, a cavity into which a material having a refractive index that increases upon UV-irradiation, such as a UV-curable resin, is injected, is formed between the optical waveguide and the optical fiber having a single core or multiple cores. To this end, a mechanically precise process is performed after mounting the optical fiber, and there is no additional grinding on the cross-section of the optical fiber. Also, by forming the optical waveguide with a core that gradually flares, the importance of accurate positioning of the optical fiber is reduced.

What is claimed is:

1. An optical fiber passive alignment method for passively aligning an optical fiber with an optical waveguide of an integrated optical device comprising:

(a) forming an optical waveguide as a layer in a longitudinal direction of a planar substrate;

(b) forming an optical fiber mounting portion on the planar substrate onto which an optical fiber is to be mounted to couple the optical fiber to the optical waveguide;

(c) mounting the optical fiber in the optical fiber mounting portion near the optical waveguide, and fixing the optical fiber to the substrate;

(d) simultaneously cutting the optical fiber mounted on the optical fiber mounting portion near the optical waveguide and the optical waveguide, such that cross-sections of the optical fiber and the optical waveguide are simultaneously ground, thereby forming a cavity between the optical fiber mounting portion and the optical waveguide;

(e) injecting a material having a refractive index that increases upon irradiation with UV rays, into the cavity; and (f) coupling the optical fiber to the optical waveguide by irradiating the material filling the groove with UV rays supplied through one of the optical fiber and the optical waveguide.

2. The optical fiber passive alignment method of claim 1, wherein in forming the optical fiber mounting portion, a portion of the optical waveguide layer on the planar substrate is partially removed to form the optical fiber mounting portion for coupling the optical fiber to the optical waveguide.

* * * * *